Figure 1:
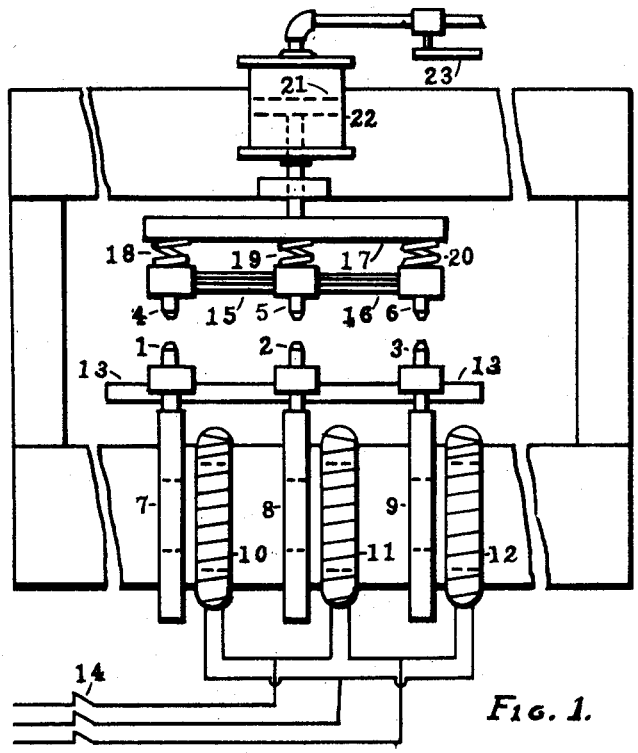

C. H. KICKLIGHTER.
APPARATUS FOR AND METHOD OF ELECTRIC FASTENING OF METALS.
APPLICATION FILED APR. 5, 1915.

1,189,584.

Patented July 4, 1916.
2 SHEETS—SHEET 1.

WITNESSES:
O. A. Kilpatrick
E. S. Stevens

INVENTOR
Charles. H. Kicklighter.

C. H. KICKLIGHTER.
APPARATUS FOR AND METHOD OF ELECTRIC FASTENING OF METALS.
APPLICATION FILED APR. 5, 1915.

1,189,584. Patented July 4, 1916.

INVENTOR
Charles H. Kicklighter

UNITED STATES PATENT OFFICE.

CHARLES H. KICKLIGHTER, OF ATLANTA, GEORGIA.

APPARATUS FOR AND METHOD OF ELECTRIC FASTENING OF METALS.

1,189,584.   Specification of Letters Patent.   Patented July 4, 1916.

Application filed April 5, 1915. Serial No. 19,215.

*To all whom it may concern:*

Be it known that I, CHARLES H. KICK-LIGHTER, a citizen of the United States, residing at Atlanta, in the county of Fulton and State of Georgia, have invented new and useful Improvements in the Apparatus for and Methods of Electric Fastening of Metals, of which the following is the specification.

The invention relates to a method and apparatus whereby a plurality and series of welds are simultaneously made by the several phase currents of a three phase electric welding system. This may be accomplished by pressing the terminals of the three phase welding current against the metal to be heated or welded, just opposite to terminals directly inter-connected, star fashion, so as to form a neutral point where the heating or welding currents reunite.

In the present method of making seams in sheet metal and iron plates, single phase current has been employed almost exclusively. Several objectionable features are encountered:

(a) The drawing of heavy current from only one phase of a three phase transmission system unbalances the whole system, and interferes materially with the voltage, service and load distribution of all the phases.

(b) The transmission of a given amount of electrical power for welding purposes is more economical by a three phase system than by a single phase.

(c) A single phase welding current must needs link a greater or less amount of iron or steel, especially in seam welding of commercial plates. Consequently, eddy currents are induced in the plates which cause heating and loss of energy. Moreover, flux is set up in the iron plates which chokes back the welding current and produces a heavy lag with poor power factor.

(d) The amount of iron, linked by the welding current in working on large plates, is constantly changing during the operation, necessitating frequent adjustment to maintain the correct strength of welding current.

The object of the present invention is to correct these evils. By the use of a three phase welding system it is evident that the equilibrium of the transmission system will not be disturbed, the power will be transmitted over a three phase system with maximum economy, each welding current will neutralize the tendency of the others to produce inductance or eddy current losses, and the welding currents will not need constant adjustment as the position of the work is shifted.

Another object is the fastening of the metal plates together at a plurality of positions at one time, with the resultant economy in time and labor.

Still another object is to simplify and facilitate the operation by handling only one set of welding current terminals on but one side of the metal plates.

The same apparatus and method may be used in the fastening of members by electrically heating and compressing a plurality of rivets, etc.

Other objects and improvements will be apparent in the following description.

Figure 2:
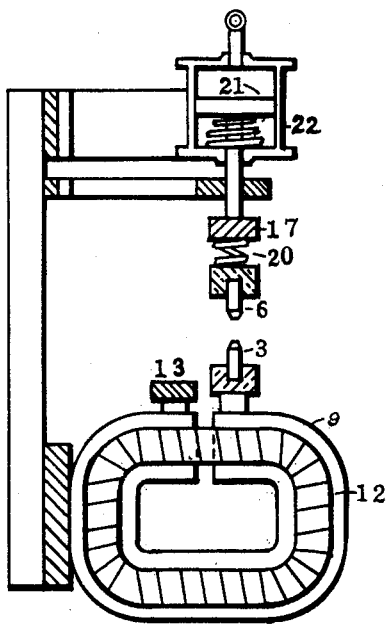
Figure 3:
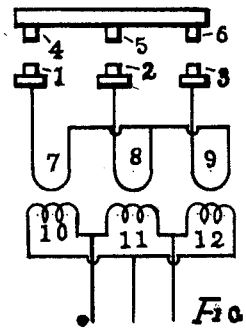
Figure 4:
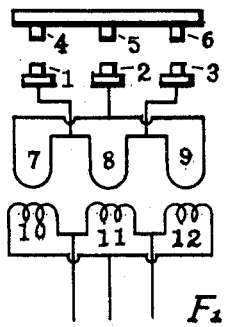
Figure 5:
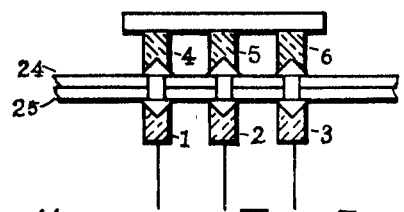
Figure 6:
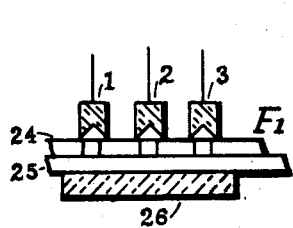
Figure 7:
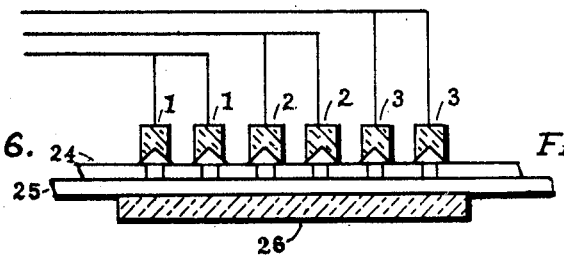
Figure 8:
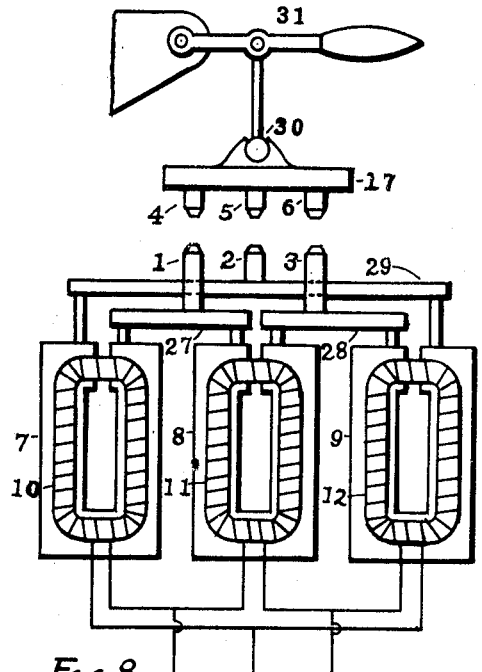
Figure 9:
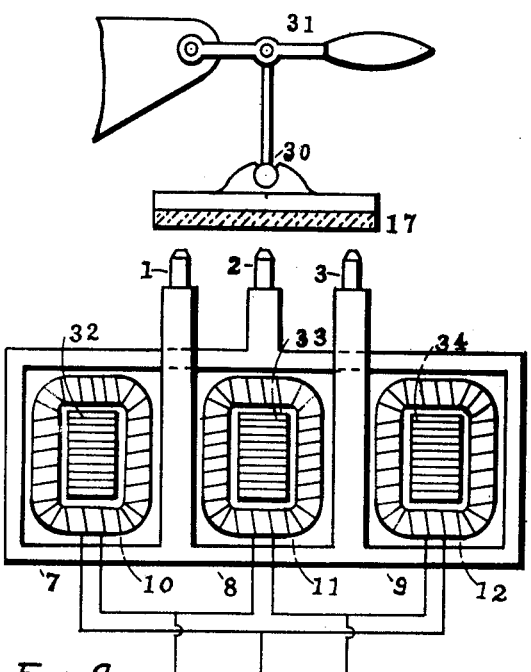
Figure 10:
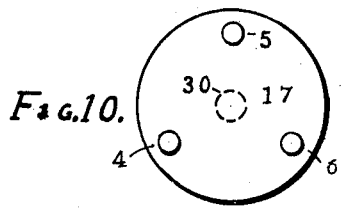
Figure 11:
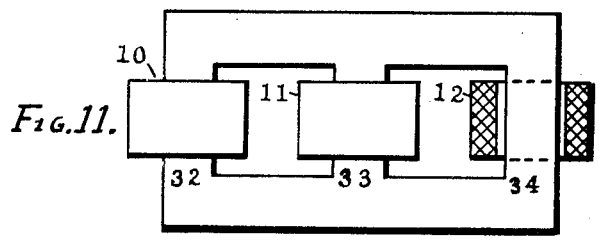
Figure 12:
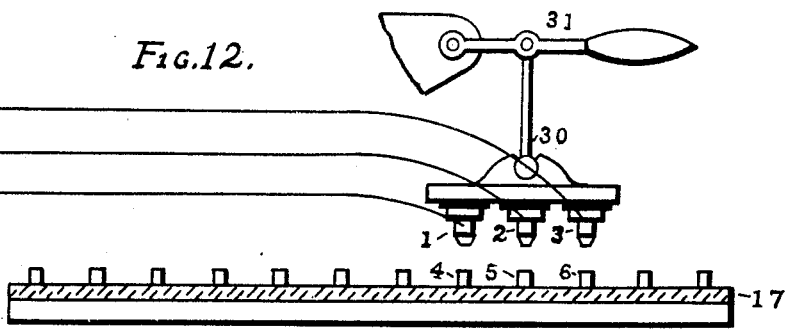

Figure 1 is a front elevation of a form of apparatus showing the method employed in the invention. Fig. 2 is a side elevation, partially sectioned, of the apparatus of Fig. 1. Fig. 3 is a diagram showing the electrical connection of Fig. 1. Fig. 4 is a diagram showing the electrical connection of Figs. 8, 9 and 12. Fig. 5 is a sketch illustrating plates between the work engaging terminals, said plates being fastened by the heating and heading of rivets. Fig. 6 is a sketch illustrating two metals being fastened together by welding inserts to the one, and forming heads on the rivets to clamp the other. Fig. 7 is a sketch illustrating the operation of Fig. 6 with a plurality of terminals connected to each phase conductor. Fig. 8 is a sketch illustrating an apparatus in which the transformer secondaries are delta connected. Fig. 9 is a sketch illustrating an apparatus in which the secondaries are framed about a single three phase transformer core. Fig. 10 illustrates a view on the under side of the phase neutralizing conductor plate of Fig. 8. Fig. 11 is a sketch illustrating how the primary windings of Fig. 9 are disposed upon the three phase transformer core. Fig. 12 illustrates the method as employed for making a seam in plates which may be mounted on a movable table or framework.

In Figs. 1 and 2 the work engaging terminals 1, 2 and 3 are oppositely disposed to the work engaging terminals 4, 5 and 6, respectively. The terminals 1, 2 and 3 are connected, respectively, to the transformer secondaries 7, 8 and 9, which are energized, respectively, by primaries 10, 11 and 12. The secondaries 7, 8 and 9 are, in this case, star connected by being all connected to neutral bar 13. The primaries are, in this case, delta connected and the line switch 14 connects to the supply.

The work engaging terminals 4, 5 and 6 are interconnected by flexible conductors 15 and 16, and are mounted through springs 18, 19 and 20 upon yoke 17. The conductors 15 and 16 are, in this case, each composed of a plurality of copper sheets. These together with the springs 18, 19 and 20 allow for proper seating of the terminals 4, 5 and 6, and the equal distribution of the mechanical pressure. The yoke 17 is forced down by piston 21 in cylinder 22, when pneumatic or hydraulic pressure is admitted by operating valve 23. Bar 13 may be connected to yoke 17, but this is not essential.

The operation is apparent. The seam is brought into proper place between work engaging electrodes 1—2—3 and 4—5—6. Valve 23 is opened and the pressure behind piston 21 forces down the piston and yoke and firmly presses the terminals 4—5—6 down upon the seam, opposite, respectively, to terminals 1—2—3. The switch 14 is now closed. Heavy welding current is induced in secondaries 7—8—9 by the current in primaries 10—11—12. The three welding currents flow from the neutral conductor 13 through the secondaries 7—8—9, respectively, by way of the work engaging terminals 1—2—3, respectively, through the thicknesses of the seam, to the work engaging terminals 4—5—6, respectively, and reunite on neutral conductors 4—15—5—16—6. The transformer secondaries may be delta connected, if preferred, as shown in Figs. 4, 8, 9 and 12, in which the action is the same and the operation identical. The apparatus may also be used for fastening plates or metals together in other ways beside that of spot welding just described. The work engaging terminals 1—2—3—4—5—6 can be removed and can be replaced by terminals of appropriate character.

Fig. 5 shows how three rivets are simultaneously heated, compressed and headed. The electrical heating and heading process is employed in lieu of the pneumatic hammer. The rivets pass through holes in the plates 24 and 25.

Fig. 6 shows how three rivet inserts, passing through holes in plate 24 and resting against plate 25, may be simultaneously each welded at one end to plate 25 and headed at the other end. The copper block 26 will facilitate the reuniting of the three phase current.

Fig. 7 illustrates the same operation as in Fig. 6, a plurality of work engaging terminals as 1—1, 2—2 and 3—3, being connected to each phase of the three phase working currents.

Fig. 8 illustrates a similar apparatus in which the secondaries 7—8—9 are delta connected by conductors 27—28—29. Upon these conductors are mounted the work engaging terminals 1—2—3. The terminals 4—5—6 are mounted on a conductor plate 17 with a ball and socket joint at 30. The terminals may be forced down upon the work or raised by lever 31. The work engaging terminals are arranged out of line, preferably at the vertices of an equilateral triangle. The three point contact arrangement, with the ball and socket connection, allows for self-adjustment and for equal distribution of mechanical pressure.

Fig. 9 illustrates still another modification, in which the delta connected secondaries 7—8—9 are combined into a single copper framework, looping around the three equal legs 32—33—34 of a three phase transformer. The conductor plate 17 is adapted to be forced down by hand lever 31 against the work just opposite to the work engaging terminals 1—2—3. The primaries 10—11—12 are wound upon the legs 32—33—34 as shown more clearly in Fig. 11.

Fig. 12 illustrates the manner in which this invention may be utilized by mounting the plates or metals upon a movable table, saddle or framework. This is composed of a good conductor 17 for reuniting the phase currents, and preferably is provided with work engaging terminals 4—5—6—etc. mounted upon said conductor 17 and adapted to press upon the seam opposite to terminals 1—2—3, respectively. This same apparatus may be employed for uniting plates by heating and heading rivets as per Fig. 5, or by welding and heading inserts as per Fig. 6. In these cases the projecting pin terminals 4—5—6 of Fig. 12 may be dispensed with. A smooth conductor or surface 17 for the operation of Fig. 6 and a counter-sunk surface to allow for the rivet heads in the operation of Fig. 5 will be more suitable.

The inventor does not limit himself in this invention to any particular method of mechanically forcing the work engaging terminals into contact with the work. Neither does he limit himself to the particular nature of the work to be done. In the case of using a plurality of work engaging terminals, connected to each phase as per Fig. 7, it is apparent that the apparatus may be used to advantage in welding the strands to the stay members of a wire fence or similar fabric. In such cases the currents will pass through the crossing wires at their crossing points to the neutralizing yoke, saddle or table 26.

What I claim is:

1. The method of fastening two pieces of metal together, consisting of applying a plurality of currents in different phase relation, and of conveying said currents, respectively, from their points of application through the parts to be heated directly to a point of neutral potential.

2. The method of welding two pieces of metal together consisting of applying on the same side thereof a plurality of currents in different phase relation, and of conveying directly said currents respectively, from their points of application through the parts to be welded to a point of common union.

3. The method of fastening two pieces of metal together, consisting of applying thereto three heating currents in three phase relation, and of directly uniting said heating currents after their passage through the parts to be heated.

4. The method of welding two pieces of metal together consisting of applying on the same side thereof three welding currents in three phase relation, and of directly uniting said welding currents after their passage through the parts to be welded.

5. The method of uniting one piece of metal to another, which consists in simultaneously passing polyphase currents from the one side to the other side of said pieces of metal, and of directly uniting said polyphase currents on the latter side of said pieces of metal.

6. In an electric metal working apparatus, the combination of a plurality of work engaging electrodes connecting respectively to the different phases of a polyphase supply of electrical energy, and of a plurality of work engaging electrodes oppositely disposed thereto and mutually inter-connected.

7. In an electric metal working apparatus, the combination of a plurality of work engaging electrodes connecting respectively to the various phases of a polyphase electrical energy supply and of a member of neutral potential oppositely disposed thereto and adapted to unite the several phases of said energy supply.

8. In an electric metal working apparatus, the combination of a plurality of transformer secondaries inter-connected and adapted to deliver polyphase currents, of a plurality of work engaging electrodes connected with said secondaries, and of means for applying said electrodes with mechanical pressure to one side of the work.

9. In an electric welding machine the combination of three transformer secondaries mutually inter-connected and adapted to supply welding currents in three phase relationship, of means for applying said welding currents to the work in hand, and of means for conducting said welding currents through the work and uniting them.

10. In an electric metal working apparatus, the combination of a set of three phase transformers with secondaries inter-connected and adapted to furnish currents in three phase relations, of a plurality of work engaging electrodes connected with said secondaries and adapted to apply said currents, and of means for collecting and reuniting said applied currents.

11. In an electric metal working apparatus, the combination of a set of three phase transformers with secondaries inter-connected of a plurality of work engaging electrodes connected with said secondaries, and means for applying said electrodes with mechanical pressure to one side of the work.

In testimony whereof, I have hereunto signed my name in the presence of two subscribing witnesses, at Atlanta, in the county of Fulton and State of Georgia, this 7th day of September, 1914.

CHARLES H. KICKLIGHTER.

Witnesses:
    FLOYD H. BATTENFIELD,
    G. B. EVERETT.